Figure 1:
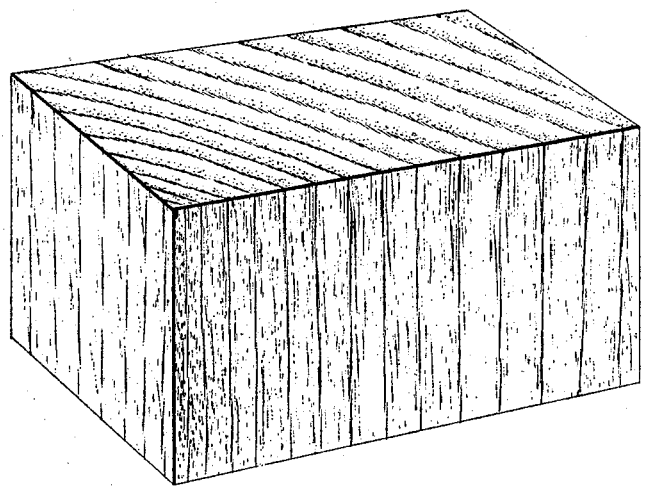

No. 794,758. PATENTED JULY 18, 1905.
F. J. WARREN, DEC'D.
R. L. WARREN & F. G. CUTTER, ADMINISTRATORS.
WOODEN BLOCK FOR PAVEMENTS.
APPLICATION FILED JUNE 21, 1902.

No. 794,758. Patented July 18, 1905.

UNITED STATES PATENT OFFICE.

FREDERICK J. WARREN, OF NEWTON, MASSACHUSETTS; RALPH L. WARREN, OF BROOKLINE, MASSACHUSETTS, AND FRANK G. CUTTER, OF BOSTON, MASSACHUSETTS, ADMINISTRATORS OF SAID FREDERICK J. WARREN, DECEASED.

WOODEN BLOCK FOR PAVEMENTS.

SPECIFICATION forming part of Letters Patent No. 794,758, dated July 18, 1905.

Application filed June 21, 1902. Serial No. 112,711.

*To all whom it may concern:*

Be it known that I, FREDERICK J. WARREN, a citizen of the United States, and a resident of Newton, in the county of Middlesex and State of Massachusetts, have invented a new and useful Improvement in Wooden Blocks for Pavements, of which the following is a full, clear, and exact description, reference being had to the accompanying drawings, forming a part of this specification, in explaining its nature.

The invention relates to the herein-described improvement in wooden blocks intended for forming street-pavements.

It consists in taking blocks of the desired shape and condition and in saturating such blocks with a composition comprising a bituminous material and creosote or other preservative oil. This composition should contain from twenty to thirty per cent. of the bituminous material and from seventy to eighty per cent. of the creosote or similar preservative oil, which are intimately combined together, forming a mixture of large fluidity.

I prefer to use a natural or artificial asphalt for the bituminous material, but do not confine myself thereto. The composition is forced into the pores of the wood by the vacuum process or in any other of the ordinary ways in which oils or other preservatives are now applied to wood. A wooden block thus saturated with a composition of bitumen and creosote is desirable for use in constructing pavements and roadways in that the creosote is held by the bituminous portion of the composition from evaporating, the bituminous portion of the composition serving to harden in the outer surface of the block, thus providing an enamel which seals the pores and prevents the escape by evaporation of the preserving-oil. It is not feasible and perhaps not desirable to use a composition which is entirely bituminous. It would be too thick and heavy to make suitable penetration of the block; but when combined with the creosote-oil the mixture is so fluid that the bituminous part is forced into the pores, as well as the preserving-oil.

The proportion of bitumen to the oil may be varied with the degree of porosity of the wood.

While I contemplate the use of a chemically pure asphalt or pure bitumen with the creosote-oil, so that it will penetrate freely into the wood, it should be understood that I do not preclude the use of the commercial asphalts. I desire to note, however, that the commercial asphalts which have heretofore been used commercially are not pure bitumen, and it has not been practicable or commercial to cause the commercial asphalt, which is not pure bitumen, to penetrate the wood on account of the non-bituminous substances in it filling up the pores of the wood and preventing the bitumen itself from entering the wood. The pure bitumen, which I contemplate using, will form a perfect union with the oils themselves and will enter the fiber of the wood, as well as will the oil, thus making a combination of the most permanent bituminous matter with creosote or a similar preserving oil and obtaining the sealing value of one and the preserving power of the other, the preserving influence being accomplished entirely by the filling of all voids in the wood with bituminous substances which absolutely preclude the entrance of air, water, or acids, which in themselves are the causes of deterioration, rotting, and disintegration of the wood, while, on the other hand, the preserving-oils are prevented from leaving the wood by evaporation.

I will now describe the invention in conjunction with the drawings, forming a part of this specification, wherein—

Figure 2:
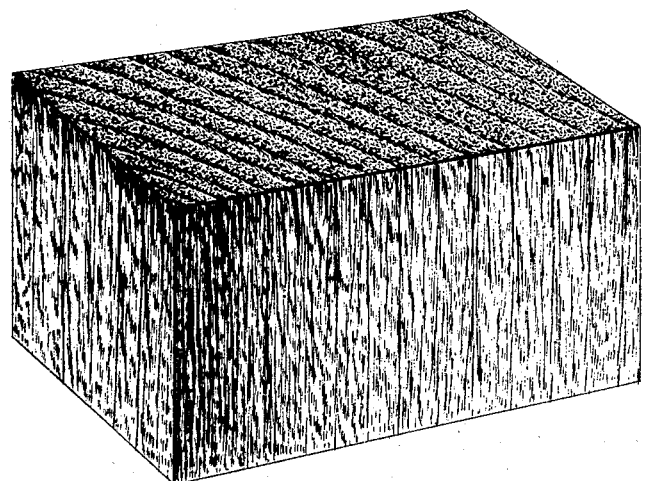

Figure 1 is a view in perspective of a wooden paving-block with its pores unfilled, and Fig. 2 is a view of the complete block with its pores filled.

Having thus fully described my invention, I claim and desire to secure by Letters Patent of the United States—

1. As an article of manufacture a wooden paving-block the pores of which contain bitumen in a flux of a light preservative in the proportion of about seventy to eighty per cent. of the flux to about twenty to thirty per cent. of bitumen.

2. As an article of manufacture a wooden paving-block the pores of which contain a mixture about twenty to thirty per cent. comparatively pure bitumen and about seventy to eighty per cent. creosote.

FREDERICK J. WARREN.

In presence of—
RALPH L. WARREN,
ALBERT C. WARREN.